United States Patent [19]

Marumoto et al.

[11] 4,291,259
[45] Sep. 22, 1981

[54] CONTROL APPARATUS FOR CONTROLLING TRANSISTOR CHOPPER FOR USE IN CURRENT SUPPLY FOR ELECTRIC MOTOR

[75] Inventors: Katsuji Marumoto; Tsutcmu Ohmae, both of Ibaraki, Japan

[73] Assignee: Hitachi, Ltd., Tokyo, Japan

[21] Appl. No.: 101,844

[22] Filed: Dec. 10, 1979

[30] Foreign Application Priority Data

Dec. 8, 1978 [JP] Japan .................................. 53-151145

[51] Int. Cl.³ .............................................. H02P 5/16
[52] U.S. Cl. ................................... 318/139; 318/341; 323/272
[58] Field of Search ...................... 318/341, 139; 323/9

[56] References Cited

U.S. PATENT DOCUMENTS

| | | | |
|---|---|---|---|
| 3,349,309 | 10/1967 | Dannettell | 318/139 |
| 3,484,652 | 12/1969 | Thiele | 318/341 |
| 3,668,495 | 6/1972 | Eisele | 318/400 |
| 3,803,471 | 4/1974 | Price et al. | 318/341 |
| 3,911,341 | 10/1975 | Carlson et al. | 318/341 |
| 3,914,671 | 10/1975 | Morton et al. | 318/139 |

*Primary Examiner*—David Smith, Jr.
*Attorney, Agent, or Firm*—Craig and Antonelli

[57] ABSTRACT

A control apparatus for controlling the supply of current for an electric motor, having a transistor chopper circuit which includes a plurality of power transistors connected in parallel, and a duty controlling oscillator circuit for controlling the ON-OFF operation of the transistor chopper circuit, by which the duty factor of current supplied for the motor through the transistor chopper circuit is controlled depending on a command signal, and wherein the operation of the duty controlling oscillator circuit is controlled depending on the amplitude of current flowing through one of the plurality of power transistors of the transistor chopper circuit.

21 Claims, 11 Drawing Figures

CONTROL APPARATUS FOR CONTROLLING TRANSISTOR CHOPPER FOR USE IN CURRENT SUPPLY FOR ELECTRIC MOTOR

BACKGROUND OF THE INVENTION

The present invention relates to a control apparatus for electric motors, such as direct current motors, which drive electric vehicles, such as golf carts, fork lift trucks and the like, but may be used for any electric drive.

The prior art reveals several attempts to provide control circuits for controlling the current supply for direct current motors in electrical vehicles. For example, U.S. Pat. No. 3,349,309 discloses a variable time ratio control circuit, particularly for use in electrical vehicles, such as small tractors and fork lift trucks, in which power is supplied intermittently to the motor through power switches including a relatively large number of power switching transistors connected in parallel. A feedback circuit including a resistor in series with the motor automatically detects and controls the amplitude of the motor current during each power pulse.

Such a circuit, however, has disadvantages which arise in the case of breakdown of one or more of the power switching transistors. In the circuit, the total current flowing through the power switching transistors is detected, and is controlled so that its value may not exceed the maximum allowable value. However, supposing that one of the power switching transistors connected in parallel has short-circuited and broken down for any cause, and thereafter has electrically opened. Then, current which was previously carried by the disabled transistor flows into the other power switching transistors resulting in an increase in the current thereof. As the number of disabled transistors increases, the amount of current flowing through each of the remaining transistors increases, and finally, the current level reaches a value where all the power switching transistors break down at once.

Another prior art system which is relevant to the present invention is disclosed in U.S. Pat. No. 3,803,471, filed on Apr. 9, 1974, and directed to "Variable Time Ratio Control Having Power Switch Which does not Require Current Equalizing Means." However, this system also has disadvantages in its operation.

SUMMARY OF THE INVENTION

An object of the present invention is to provide a new control apparatus for use in the control of the current supply for a motor in an electrical vehicle, which prevents the influence of the breakdown of one or more power switching transistors on the other transistors and which can normally operate even under conditions where the number of parallel power switching transistors is reduced.

Another object of the present invention is to provide a control apparatus for use in the control of the current supply for a motor in an electrical vehicle, in which the power switching transistors can be protected in safety from breakdown due to current overflow.

The foregoing objects can be achieved by a control apparatus having a source of direct current; a transistor chopper circuit having a plurality of power transistors connected in parallel, which circuit is series connected with the direct current source for regulating the current supplied to the electric motor; means for producing a command signal representing the desired speed of the motor; a duty controlling oscillator circuit for generating an output signal on the basis of the command signal from the command signal producing means, by which the duty factor of the current supplied for the electric motor via the transistor chopper circuit is determined; and a driver circuit for generating a driving pulse in response to the output signal from the duty controlling oscillator circuit and for applying that driving pulse to the chopper circuit, whereby the ON-OFF operation of the transistor chopper circuit is controlled. The amplitude of current flowing through a selected one of the plurality of power transistors is detected, and the output signal of the duty controlling oscillator circuit is controlled depending on the detected amplitude of the current. Namely, the duty factor of the current supplied for the electric motor via the transistor chopper circuit is controlled depending on the amplitude of the current flowing through the selected one of the plurality of power transistors of the chopper circuit.

Another object of the present invention is achieved by provision of an abnormality-detecting circuit which detects any abnormality in a selected one of the plurality of power transistors of said chopper circuit and controls the operation of the duty controlling oscillator circuit in response thereto.

The objects mentioned above and other objects and advantages of the present invention will become more apparent from the following detailed description of the preferred embodiment given by reference to the accompanying drawings.

DETAILED DESCRIPTION OF PREFERRED EMBODIMENT

Figure 1:
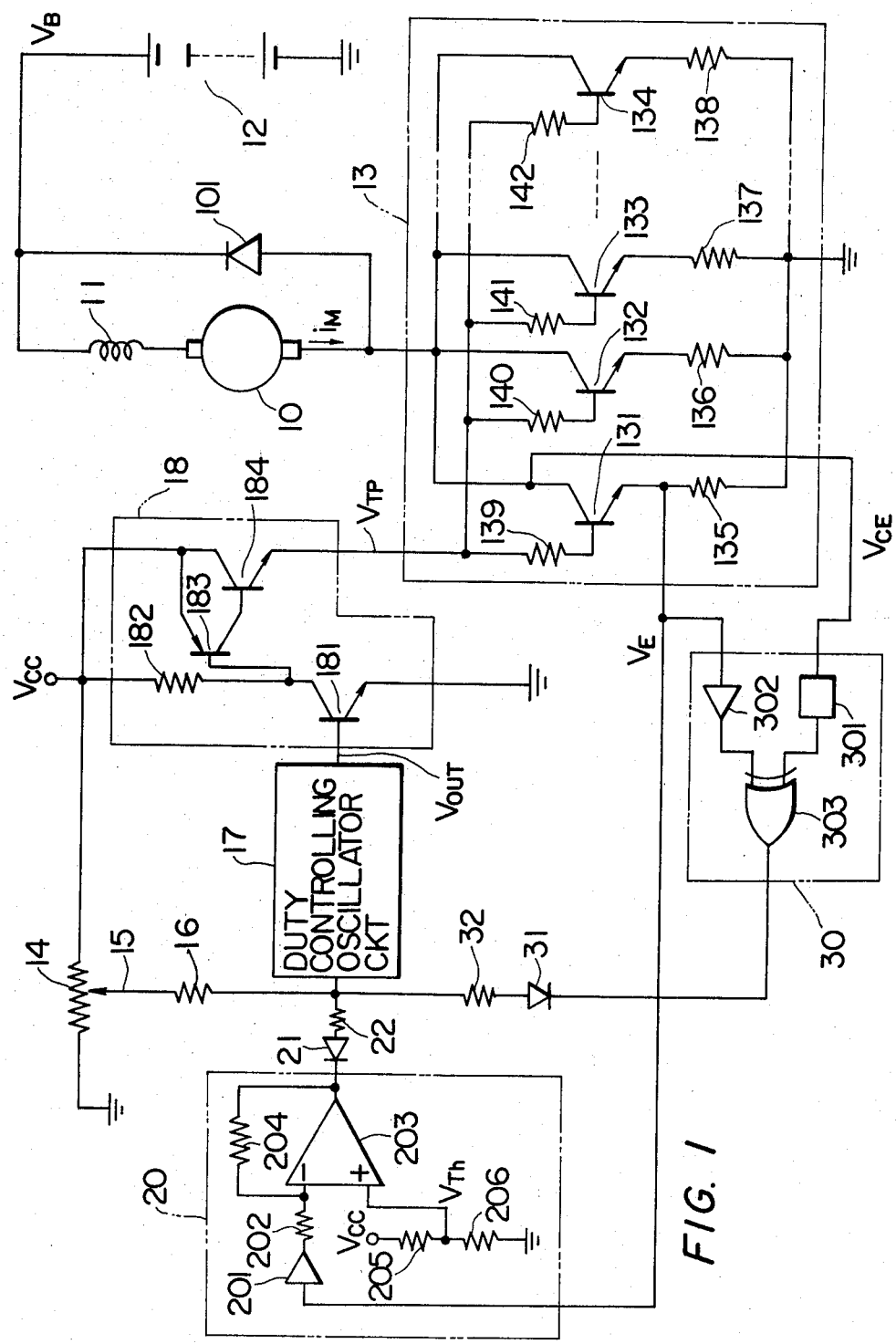
FIG. 1 is a schematic circuit diagram of the apparatus for supplying current for a direct current motor in accordance with the present invention.

Referring now to the drawings, particularly to FIG. 1, a D-C motor 10 of an electric vehicle has a series-connected field winding 11. A battery 12 supplies current to the D-C motor 10 through a current control means, such as a chopper circuit 13 including plural power transistors connected in parallel.

The cathode of a freewheel diode 101 is connected to a positive pole of the battery 12 generating a D-C voltage $V_B$, while the anode of the freewheel diode 101 is connected to the lower voltage side of the D-C motor 10. Thus, the freewheel diode 101 is in parallel connection with the series connection of the D-C motor 10 and the field winding 11. An upper side terminal of the chopper circuit 13 is connected to the lower voltage side of the D-C motor 10, and a lower side terminal thereof is connected to the negative pole of the battery 12 through ground. When the chopper circuit 13 is blocked, the current of the D-C motor 10 can continue to flow through the freewheel diode 101, as is well known in the art.

A D-C control voltage $V_{CC}$, which is connected to one end of a potentiometer 14, is made available for supplying electric power to a control circuit which will be described hereinafter. The other end of the potentiometer 14 is connected to ground, while the movable tap 15 thereof is connected via an input resistor 16 to an input terminal of a duty controlling oscillator circuit 17 which produces an output pulse signal $V_{OUT}$. The duty factor of the output pulse varies depending on the voltage value which is applied at the input terminal of the circuit 17. Various duty controlling oscillator circuits for producing such an output are well known in the art; however, one example of such a duty controlling oscillator circuit which may be used with the present invention is disclosed in detail in our U.S. patent application Ser. No. 915,582, filed on June 6, 1978. The duty controlling oscillator circuit shown and described in the above-referenced application includes an integrator composed of an operational amplifier having a negative feedback through a condenser to the (+) input terminal thereof to which a command signal is also applied, and another operational amplifier having a positive feedback through a resistor which operates as a hysteresis comparator. To the (+) input terimal of the hysteresis comparator is applied the output from the integrator and to the (−) input terminal thereof is applied a divided reference of the D-C control voltage.

The movable tap 15 of the potentiometer 14 mechanically cooperates with the accelerator pedal of an electrical vehicle. The command signal produced at the movable tap 15 of the potentiometer 14 has an amplitude which is in direct proportion to the amount of depression of the accelerator pedal.

The duty controlling oscillator circuit 17 produces an output pulse signal $V_{OUT}$ on the basis of the command signal applied to the input thereof, and applies this output pulse via a driver circuit 18 to the chopper circuit 13. More specifically, the output pulse signal $V_{OUT}$ is applied to the base of an NPN transistor 181, the collector of which is connected via a resistor 182 to the D-C control voltage $V_{CC}$ and the emitter of which is connected to ground. The base of a PNP transistor 183 is connected to the collector of the NPN transistor 181. The emitter and the collector of the PNP transistor 183 are connected to the collector and the base of an NPN transistor 184, respectively. The collector of the NPN transistor 184 is connected to the D-C control voltage $V_{CC}$, and the emitter thereof is connected to the transistor chopper circuit 13. The driver circuit 18 including these transistors 181, 183 and 184 produces a driving pulse signal $V_{TP}$ from which the ON-OFF operation of the transistor chopper circuit 13 is controlled.

The chopper circuit 13, as is shown in FIG. 1 includes four power switching transistors 131, 132, 133 and 134 which are connected in parallel to one another. The collectors of these power transistors 131, 132, 133 and 134 are connected in common to the lower voltage side of the D-C motor 10, and the emitters thereof are connected to ground through emitter resistors 135, 136, 137 and 138, respectively. The bases of these power transistors 131, 132, 133 and 134 are connected via respective base resistors 139, 140, 141 and 142 to the emitter of the transistor 184 of the driver circuit 18, at which, as is mentioned above, the driving pulse signal $V_{TP}$ appears. It should be noted that a chopper circuit 13 constructed with five or more power switching transistors may also be provided in place of the chopper circuit in any way by the number of power switching transistors employed.

The voltage signal representing the amplitude of current flowing through one of these power transistors of the chopper circuit 13, for example, the power transistor 131 in the embodiment shown in FIG. 1, is applied to a limiter circuit 20. Namely, the voltage signal appearing across the emitter resistor 135 of the one power transistor 131 is applied via an amplifier 201 and an input resistor 202 to the (−) input terminal of a comparator 203 which is mainly composed of an operational amplifier (OP amplifier). Between the (−) input terminal and an output terminal of the OP amplifier 203 is inserted a feedback resistor 204. The (+) input terminal of the OP amplifier 203 is provided with a reference voltage divided by series connected resistors 205 and 206, the junction of which is connected to the (+) input terminal and the D-C control voltage $V_{CC}$ being applied across the series connected resistors 205 and 206. The output signal appears at the output terminal of the OP amplifier 203, and is fed via a reverse-connected diode 21 and a resistor 22 to the input terminal of the duty controlling oscillator circuit 17.

The operation of the above-mentioned electric circuitry of the electric vehicle in accordance with the present invention will be given with reference to FIGS. 2(a) to (d) and 3 hereinafter.

Figure 2:
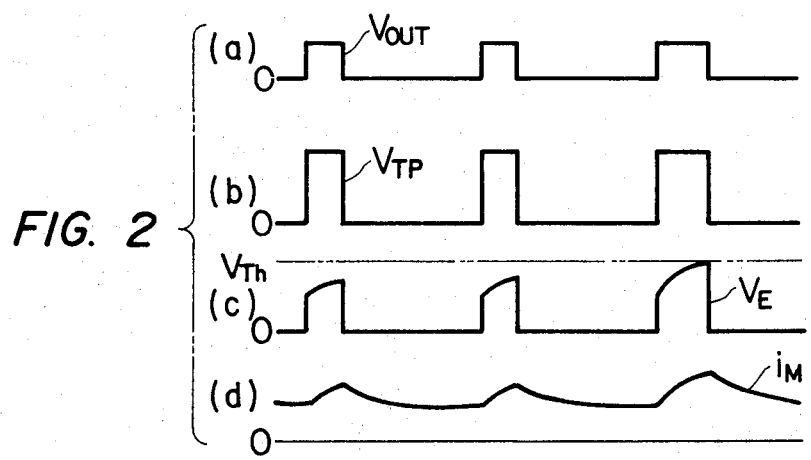
FIGS. 2(a) to (d) are waveform diagrams of the signals and current at various portions of the apparatus shown in FIG. 1.

The duty controlling oscillator circuit 17 produces the output pulse signal $V_{OUT}$ on the basis of the command signal at the movable tap 15 of the potentiometer 14. The output pulse signal $V_{OUT}$, as is illustrated in FIG. 2(a), determines the duty factor of the current supplied through the chopper circuit 13, namely, the ON-OFF operation of the power transistors 131, 132, 133 and 134 of the chopper circuit 13. As is illustrated in FIG. 2(b), the driver circuit 18 amplifiers the output pulse signal $V_{OUT}$, and applies the amplified triggering pulse $V_{TP}$ to the bases of the power transistors 131, 132, 133 and 134 of the chopper circuit 13. These power transistors 131, 132, 133 and 134 of the chopper circuit 13, on the receipt of the triggering pulse $V_{TP}$ from the driver circuit 18, becomes conductive, and current begins to flow therethrough. Across the emitter resistor 135 of the power transistor 131, which is arbitrarily selected as the one of the plurality of the power transistors on which to base control, appears the voltage signal $V_E$ in direct proportion to the amplitude of the current flowing through the power transistor 131, as is illustrated in FIG. 2(c). Through the D-C motor 10, motor current $i_M$ flows as is illustrated in FIG. 2(d).

The limiter circuit 20 produces an output voltage equal to the D-C control voltage $V_{CC}$ when the input voltage, i.e., the voltage signal $V_E$ appearing across the emitter resistor 135 of the power transistor 131, is less than the threshold value $V_{Th}$. The threshold value $V_{Th}$ is produced, as is previously described, by dividing the D-C control voltage $V_{CC}$ with the series connected resistors 205 and 206, and the value thereof is determined by taking the current capacity of the power transistor 131 into consideration, i.e., is selected at a value near the maximum current capacity of the power transistor. It should be noted that these four power transistors 131, 132, 133 and 134 have the same current capacities.

When the limiter circuit 20 produces an output equal to the voltage $V_{CC}$, the current which is inclined to flow from the output terminal of the limiter circuit 20 to the input terminal of the duty controlling oscillator circuit 17 is blocked by the reverse-connected diode 21. Under these conditions, the command signal at the movable tap 15, i.e., a voltage signal having an amplitude which is in direct proportion to the amount of depression of the accelerator pedal, is directly applied to the input terminal of the duty controlling oscillator circuit 17 without any influence thereon by the limiter circuit 20.

Figure 3:
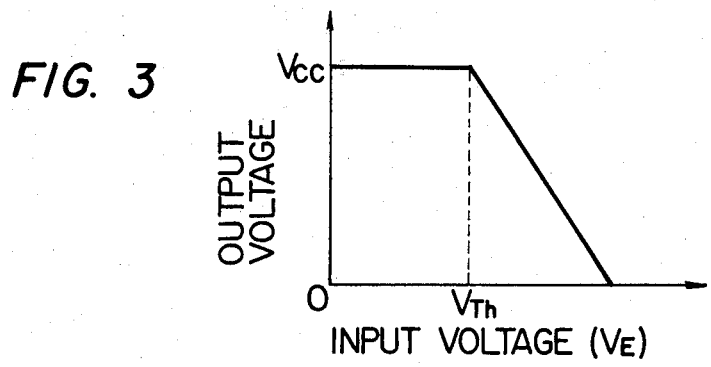
FIG. 3 is a diagram of the input-output characteristics of a limiter circuit shown in FIG. 1.

On the other hand, when the voltage signal $V_E$ across the emitter resistor 135 of the power transistor 131 is greater than the threshold value $V_{Th}$, the voltage output of the limiter 20 decreases in direct proportion to the difference between the voltage signal $V_E$ and the threshold value $V_{Th}$, as is illustrated in FIG. 3. Then, when the signal at the output of limiter circuit 20 falls below the value of the signal applied to the input of duty controlling oscillator circuit 17 from movable tap 15, current flows from the input terminal of the duty controlling oscillator circuit 17 through the resistor 22 and the diode 21 to the output terminal of the OP amplifier 203 of the limiter circuit 20 since diode 21 is now forward biased. The command signal at the input terminal of the duty controlling oscillator circuit 17 thereby decreases, and the duty factor of the output pulse signal $V_{OUT}$ decreases. Therefore, the duty factor of the current supplied for the D-C motor 10 through the chopper circuit 13 is so controlled that the amplitude of the current flowing through the one selected power transistor 131 of the chopper circuit 13 may not exceed the maximum current capacity thereof.

The amplitude of current $I_C$ flowing through the chopper circuit at that time is described by the following equation:

$$I_C = I_{C1} \times n \quad (1)$$

wherein $I_{C1}$ represents the amplitude of current flowing through the one selected power transistor of the chopper circuit 13, and n is the number of power transistors installed therein.

Assuming now that one of the power transistors of the chopper circuit 13 has broken down on account of any cause, the chopper current $I_C$ decreases in amplitude in accordance with the following equation:

$$I_C = I_{C1} \times (n-1) \quad (2)$$

That is, even if the number of disabled power transistors increases, the amplitude of current flowing through each power transistor of the chopper circuit 13 does not increase. Therefore, although the chopper current $I_C$ decreases as the number of disabled power transistors increases, the remaining power transistors are not affected by the disabled power transistor or transistors since the ON-OFF operation of the chopper circuit 13, i.e., the duty factor of the chopper circuit $I_C$, is controlled by monitoring the amplitude of current flowing through a selected one of the power transistors of the chopper circuit 13.

Turning to FIG. 1 again, an abnormality-detecting circuit 30 includes a voltage converter circuit 301, an amplifier circuit 302 and an exclusive OR gate 303. The input terminal of the voltage converter circuit 301 is connected to the collector of the power transistor 131 of the chopper circuit 13, and the output terminal thereof is connected to the lower side input terminal of the exclusive OR gate 303. The voltage converter circuit 301 is, for example, constructed of dividing resistors in the well-known manner. The input terminal of the amplifier circuit 302 is provided with the voltage signal $V_E$ mentioned previously, and the output terminal thereof is connected to the upper side terminal of the exclusive OR gate 303. The output terminal of the exclusive OR gate 303, in other words, of the abnormality-detecting circuit 30, is connected via a reverse-connected diode 31 and a resistor 32 to the input terminal of the duty controlling oscillator circuit 17.

The operation of the above-mentioned abnormality-detecting circuit 30 will be given with reference to FIGS. 4(a) to (e) hereinafter.

Figure 4:
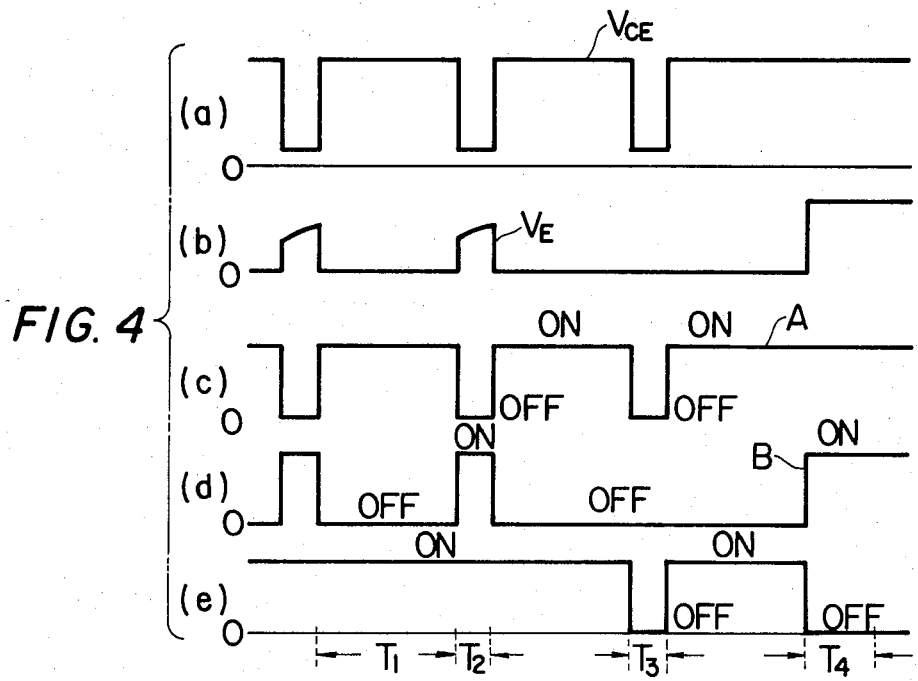
FIGS. 4(a) to (e) are waveform diagrams of the signals at various portions of an abnormality-detecting circuit shown in FIG. 1.

When the power transistor 131 is in the conductive state, the voltage signal $V_{CE}$ at the collector thereof becomes:

$$V_{CE} = V_{CES} + V_E \quad (3)$$

wherein $V_{CES}$ represents the saturation voltage of the power transistor 131. At this time, the voltage signal $V_E$ which appears across the emitter resistor 135 becomes as follows:

$$V_E = I_{C1} \times R_{E1} \quad (4)$$

wherein $R_{E1}$ represents the resistance value of the emitter resistor 135. When the power transistor 131 is in the nonconductive state, the voltage signal $V_{CE}$ becomes a high voltage, and the voltage signal $V_E$ becomes about zero. These voltage signals $V_{CE}$ and $V_E$ are illustrated in FIGS. 4(a) and (b). The voltage signal $V_{CE}$ is reduced in level and shaped by the voltage converter circuit 301, and the voltage signal $V_E$ is amplified and shaped by the amplifier circuit 302, down and up to a logic circuit level, respectively. These shaped signals are illustrated in FIGS. 4(c) and (d) where they are denoted by A and B, respectively.

The judgment of the normality or abnormality of the power transistor 131 of the chopper circuit 13 can be effected by the exclusive OR gate 303 as stated below. Under conditions of normal operation, when the power transistor 131 is in the non-conductive state, as is illustrated in the period $T_1$ in FIGS. 4(c) to (e), the signal A of the voltage converter circuit 301 is at its high level, and the signal B of the amplifier 302 is at its low level. The exclusive OR gate 303 therefore produces an output signal C at a high level at the output terminal thereof on receipt of these two input signals A and B. When the power transistor 131 is in the conductive state, as is illustrated during the period $T_2$, the signal A is at its low level, and the signal B is at its high level. Therefore, the exclusive OR gate 303 also produces the output signal C at a high level.

On the other hand, under abnormal conditions of the power transistor 131, such as occurs with a breakdown thereof producing a short-circuit due to current overflow, as illustrated in FIGS. 4(c) to (e), the output signal C will appear at its low level. In this regard, as seen during the period $T_3$, even if the collector voltage $V_{CE}$ decreases down to $V_{CES}$, no current flows through the power transistor 131. Both signals A and B are at their low levels, and the exclusive OR gate 303 provides the output signal C at a low level at the output terminal thereof. In the period $T_4$, where the transistor 131 provides an open circuit, even though current flows through the emitter of the power transistor 131, the collector voltage does not decrease. Both signals A and B are at their high level, therefore, the output signal C is at its low level.

As is apparent from the above description, the output signal C of the abnormality circuit 30 is at its high level under normal operating conditions of the power transistor 131; while, the output signal C is at its low level under all abnormal conditions thereof.

When the above-mentioned abnormality-detecting circuit 30 detects an abnormality in the operation of the power transistor, i.e., provides the output signal C at its low level at the output terminal thereof, current flows from the input terminal of the duty controlling oscillator circuit 17 through the resistor 32 and the diode 31 to the output terminal of the exclusive OR gate 303. The voltage signal applied at the input terminal of the duty controlling oscillator circuit 17, therefore, is drawn down toward zero, i.e., it is reduced and/or blocked. In addition, the duty factor of the output pulse signal $V_{OUT}$ of the duty controlling oscillator circuit 17 decreases toward zero and/or the oscillation thereof is stopped, whereby the operation of the power transistors of the chopper circuit 13 can be stopped and thereby protected from breakdown.

According to the present invention, even in the case where one or more power transistors have broken down for any cause in the chopper circuit of the type in which a large number of power transistors are connected in parallel, the total current of the chopper circuit can be safely and automatically limited in correspondence with the number of disabled power transistors without exerting any influence on the remaining power transistors, and the chopper circuit does not need to be immediately stopped.

While we have shown and described an embodiment in accordance with the present invention, it is understood that the same is not limited thereto but is susceptible of numerous changes and modifications as are obvious to those of ordinary skill in the art, and we therefore do not wish to be limited to the details shown and described herein but intend to cover all such changes and modifications as are obvious to those of skill in the art.

What is claimed is:

1. A control apparatus for controlling the supply of current for an electric motor, comprising a source for supplying direct current to the motor; transistor chopper circuit means, including a plurality of power switching transistors connected in parallel, which is series connected with said direct current source for controlling the current to be supplied to the electric motor; means for producing a command signal representing the desired speed of said motor; duty controlling oscillator circuit means for generating an output signal on the basis of the command signal from said command signal producing means, by which the duty factor of the current supplied for the electric motor via said transistor chopper circuit means is determined by controlling the ON-OFF operation of said transistor chopper circuit means on the basis of said output signal; means connected to a preselected one of said plurality of power transistors for detecting the amplitude of current flowing therethrough; and limiter circuit means for controlling said duty controlling oscillator circuit means in response to the output from said current detecting means, whereby the duty factor of the current supplied for the electric motor is regulated in dependence on the amplitude of the current flowing through said preselected one of said plurality of power transistors of said chopper circuit means.

2. A control apparatus as claimed in claim 1, wherein said limiter circuit means comprises comparator means for comparing the output from said current detecting means with a predetermined reference value and for producing a control signal when the output signal from said current detecting means exceeds said predetermined reference value, which control signal serves to regulate said transistor chopper circuit means so as to control the duty factor of the current supplied to the electric motor.

3. A control apparatus as claimed in claim 2, wherein said comparator circuit means produces a control signal at a selected D-C voltage level when the output signal from said current detecting means is less than the predetermined reference value, and produces a control signal decreasing in value from said D-C voltage level depending on the difference between the output signal from said current detecting means and the predetermined reference value when the output signal from said current detecting means exceeds the predetermined reference value.

4. A control apparatus as claimed in claim 2, including control means responsive to said control signal from said limiter circuit means for regulating the input signal to said transistor chopper circuit means.

5. A control apparatus as claimed in claim 3, including control means for regulating the input signal to said transistor chopper circuit means only when said control signal decreases below a predetermined value.

6. A control apparatus as claimed in claim 4 or 5, wherein said control means comprises a reverse-connected diode connected between the output of said limiter circuit means and the input terminal of said duty controlling oscillator circuit means, to which input terminal of said duty controlling oscillator circuit means is also provided the command signal from said command signal producing means.

7. A control apparatus as claimed in claim 1, further comprising abnormality-detecting circuit means responsive to the voltage across one of said plurality of power transistors of said transistor chopper circuit means for detecting breakdown of said power transistor.

8. A control apparatus as claimed in claim 7, wherein said abnormality-detecting circuit means comprises an exclusive OR gate, to the two input terminals of which are applied respective logic inputs produced on the basis of the voltages appearing at the collector and the emitter of the one of said plurality of power transistors of said transistor chopper circuit means, respectively.

9. A control apparatus as claimed in claim 7, including further control means responsive to the output of said abnormality-detecting circuit means for regulating the input signal to said transistor chopper circuit means.

10. A control apparatus as claimed in claim 9, wherein said further control means comprises a further reverse-connected diode connected between the output of said abnormality-detecting circuit means and the input of said duty controlling oscillator circuit means.

11. A control apparatus as claimed in claim 1, wherein driver circuit means is connected between said duty controlling oscillator circuit means and said transistor chopper circuit means for generating a triggering pulse signal in response to said output signal for controlling the operation of said power switching transistors.

12. A control apparatus as claimed in claim 3, further comprising abnormality-detecting circuit means responsive to the voltage across one of said plurality of power transistors of said transistor chopper circuit means for detecting breakdown of said power transistor.

13. A control apparatus as claimed in claim 12, including control means for regulating the input signal to said transistor chopper circuit means only when said control signal decreases below a predetermined value.

14. A control apparatus as claimed in claim 13, including further control means responsive to the output of said abnormality-detecting circuit means for regulating the input signal to said transistor chopper circuit means.

15. A control apparatus as claimed in claim 14, wherein said further control means comprises a further reverse-connected diode connected between the output of said abnormality-detecting circuit means and the input of said duty controlling oscillator circuit means.

16. In a control apparatus for controlling the supply of current from a direct current source to an electric motor by means of a chopper circuit including a plurality of power switching transistors connected in parallel and a duty controlling oscillator circuit means responsive to a command signal representing the desired speed of said motor for generating an output signal by which the duty factor of said chopper circuit is controlled, the improvement comprising detecting means connected to a preselected one of said plurality of power transistors for detecting the amplitude of current flowing therethrough, and control circuit means responsive to said detecting means for regulating said command signal which is supplied to said duty controlling oscillator circuit means.

17. A control apparatus as claimed in claim 16, wherein said control circuit means comprises comparator means for comparing the output from said detecting means with a predetermined reference value and for producing a control signal when the output of said detecting means exceeds said predetermined reference value.

18. A control apparatus as claimed in claim 17, wherein the output of said control means is connected to the input of said duty controlling oscillator circuit means through a reverse-connected diode.

19. A control apparatus as claimed in claim 16, further comprising abnormality-detecting circuit means responsive to the voltage across one of said plurality of power transistors of said transistor chopper circuit means for detecting breakdown of said power transistor.

20. A control apparatus as claimed in claim 19, wherein said abnormality-detecting circuit means comprises an exclusive OR gate, to the two input terminals of which are applied respective logic inputs produced on the basis of the voltages appearing at the collector and the emitter of the one of said plurality of power transistors of said transistor chopper circuit means, respectively.

21. A control apparatus as claimed in claim 20, wherein the output of said abnormality-detecting circuit means is connected to the input of said duty controlling oscillator circuit means through a reverse-connected diode.

* * * * *